INVENTOR.
Kurt Schlesinger
BY
Foorman L. Mueller
Atty.

INVENTOR.
Kurt Schlesinger
BY
Foorman L. Mueller
Atty.

United States Patent Office 2,775,738
Patented Dec. 25, 1956

2,775,738

MODULATOR

Kurt Schlesinger, Maywood, Ill., assignor to Motorola, Inc., Chicago, Ill., a corporation of Illinois Application August 30, 1951, Serial No. 244,335
5 Claims. (Cl. 332—43)

This invention relates generally to modulator systems, and more particularly to a balanced modulator in which both the carrier wave and the modulating signal are balanced out and only the modulation products or sidebands remain.

The use of balanced modulators, which eliminate more or less of the carrier wave which is modulated, is well known and has been used in many applications. In such systems the modulating signal has usually been of much lower frequency than the wave being modulated so that it is automatically rejected in the system in one manner or another. In any event, when the modulating signal is of a widely different frequency than the modulated wave, the modulating signal can be easily separated out by a filter or the like when this is desirable.

There are, however, applications in which the frequency of the modulating signal and the modulation products are sufficiently close or which actually overlap, so that it would be difficult or impossible to filter the modulating signal from the modulated wave. One application of this is in color television systems wherein a color subcarrier wave is modulated by a video component to provide color information transmitted along with the standard video or brightness signal. As such television systems operate within a band of 6 megacycles, it has been proposed to use color subcarrier frequencies of the order of 3.5 to 4 megacycles. This subcarrier is then modulated by a chromaticity signal having components as high as 1.5 or even 2 megacycles, with the modulation products extending from about 2 megacycles to 5 megacycles or more. It is therefore seen that to separate the modulating video signal from the modulated color subcarrier would require a filter which would discriminate sharply between frequencies above and below 2 megacycles or so. To provide satisfactory filtering within these limits would require carefully designed filter circuits.

It is therefore an object of the present invention to provide a double balanced modulator in which both the carrier wave and the modulating signal are balanced out and thereby eliminated.

Another object of this invention is to provide a simple modulating system for providing a modulated wave having frequencies closely adjacent to those of the modulating signal in which the modulating signal is eliminated from the output.

A feature of this invention is the provision of a modulating system having two identical modulating sections to both of which are applied the modulating signal and a carrier wave to be modulated, with the output of the two sections being combined to add the sidebands from the two sections, and balance out the fundamental components of the modulating signal and the carrier wave.

Another feature of this invention is the provision of a double-balanced modulator including two sections each having a vacuum tube, with the carrier wave to be modulated and the modulating signal each being applied to an electrode of the tubes of both sections, and output circuit means for combining the waves at such levels and with such polarity that the modulating signal and carrier wave balance out and the modulation products are additive.

A further feature of this invention is the provision of a double-balanced modulator including a pair of triodes with the carrier wave being applied to the cathodes thereof in opposite polarity, the modulating signal being applied to the grids of the tubes in opposite polarity, and the outputs from the plates of the sections being directly combined, so that the carrier wave and modulating signal are balanced out and the modulation products are added. A balancing arrangement may be coupled to the grids to insure complete balancing of the modulating signal.

A still further feature of the invention is the provision of a double-balanced modulator including two triode sections with the carrier wave being applied to the grid of one section and the cathode of the other, the modulating signal being applied to the cathode of the one section and the grid of the other, and the plates of the sections being directly connected together to combine the outputs so that the modulation products are added and the carrier wave and the modulating signals are balanced out. A circuit is provided for adjusting the level of the signals so that the carrier wave and the modulating signals in the two sections are accurately balanced and will therefore be completely eliminated from the output.

Further objects and features, and the attending advantages of the invention will be apparent from a consideration of the following description when taken in connection with the accompanying drawings in which:

Fig. 1 is a circuit diagram illustrating a simplified modulator in accordance with the invention;

Fig. 2 includes curves illustrating the operation of the system;

In practicing the invention there is provided a modulator system including a pair of substantially identical modulating sections. Each of these sections includes an electron discharge valve which may be of the triode type, and the two triode sections may be included in a single envelope. The carrier to be modulated is applied to each of the sections and the modulating signal is also applied to each of the sections. The output from the two sections are then combined in such manner that the carriers in the two sections and the modulating signals therein are balanced out, and the modulation products or sidebands are added. This may be accomplished by applying the signals to the electron discharge valves in various ways. For example, the carrier may be applied in opposite phase to the two electrodes of the valves and the modulating signal applied in opposite phase to two other electrodes. In this system, with the anodes directly connected, the carrier and modulating signal outputs of the two sections balance out. A bridge network may be connected to the electrodes so that accurate balance can be obtained. By the use of pentagrid tubes, second harmonics will not be produced in the modulating sections. In another form of the system, the carrier can be applied to the grid of the triode in one section and the cathode of the triode of the other section in the same phase, and the modulating signal may be applied to the cathode of the one section and the grid of the other section in the same phase. Phase reversal is thereby provided directly by triodes so that in the output from the plates thereof the carrier and the modulating signal are of opposite phase and balance out.

Figure 1:
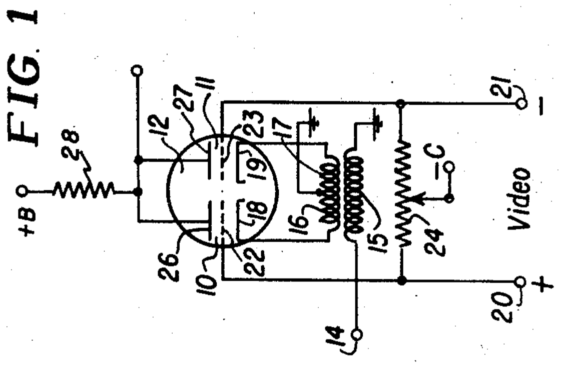

Referring now to the drawings, in Fig. 1 there is illustrated a simplified embodiment of the modulating system. The double-balanced sections are provided by the triodes 10 and 11, which are included in a single envelope 12. The carrier may be applied to a terminal 14 connected to the winding 15. The winding 15 is inductively coupled to balanced winding sections 16 and 17 through which the carrier wave is applied to the cathodes 18 and 19 of the triodes 10 and 11 respectively. The carrier wave is therefore applied to the cathodes 18 and 19 in a balanced manner, with equal amplitude and opposite phase.

The modulating signal is applied to the system at terminals 20 and 21 in opposite phase. A positive signal may be applied at the terminal 20 and a negative signal at the terminal 21. The modulating signal is applied from terminals 20 and 21 to the grids 22 and 23 of the triodes 10 and 11. The positive and negative modulating signals are balanced so that the modulating signals applied to the two modulating sections are of equal amplitude and opposite phase. For completely balancing the system, a bridge circuit is provided including resistor 24 connected between the grids 22 and 23, with a movable tap thereon connected to a source of negative potential. By proper adjustment of the movable tap accurate balance of the system may be provided.

The anodes 26 and 27 of the triodes 10 and 11 are connected together so that the output of the two triodes are directly added. B plus potential is applied to the anodes through a load resistor 28. Since the carrier wave and the modulating signal are applied to the two sections in a balanced manner, the fundamental components thereof will directly cancel out in the anodes of the valves, and will not appear in the output from the modulator system.

Figure 2:
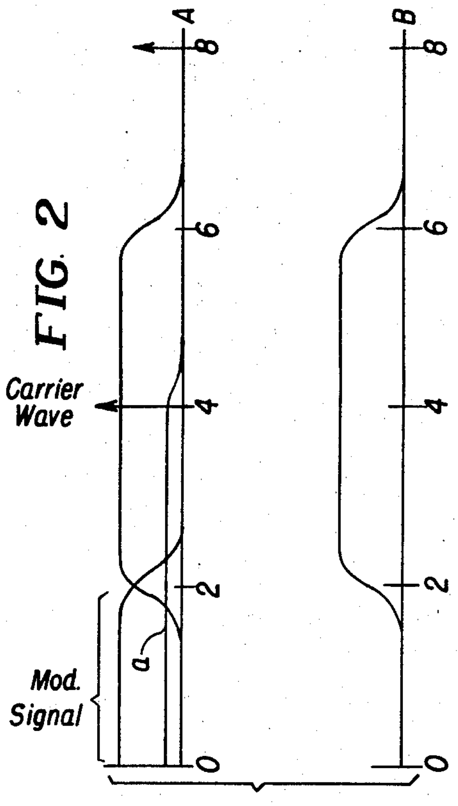

The operation of the system is illustrated by the curves of Fig. 2. The carrier is shown at 4 megacycles and the modulating signal is shown as a composite signal varying between zero and 2 megacycles and extending in attenuated form beyond 2 megacycles. Curve A shows the complete output of each section, with the carrier wave and modulating signal being present as well as the sidebands which extend on either side of the carrier by an amount depending upon the modulating signal. When using triode tubes, second harmonics of the modulating signal and the carrier may also be produced. The second harmonic of the modulating signal (designated *a*), will be within the range of the desired modulation products but will be of reduced amplitude. This amplitude can be held quite low by proper operation of the system. The second harmonic of the carrier will be at 8 megacycles and can be easily removed. The output of the two sections will be the same with the fundamental components of the carrier and modulating signal in the two sections being out of phase as previously described. In the combined output from the system the carrier and modulating signal will therefore be balanced out, but the sidebands will be additive since the two reversals in phase will provide an in-phase relation therebetween. This is illustrated in curve B of Fig. 2 wherein the carrier and modulating signal are not present. It may be desired to utilize only one sideband and, if so, the other sideband can be eliminated by filtering.

In applications wherein the modulating signal is of a widely different frequency from the carrier wave, the elimination of the modulating signal is not a problem, and either takes place automatically in the system or may be provided by simple filtering. In applications such as shown in Fig. 2, filtering out of the modulating signal would be quite difficult since it extends very close to and overlaps the modulation products or sidebands which are desired. Although complete elimination of the carrier may not be desirable in some applications, as where the carrier is to be used for demodulation, controlled amounts of the carrier may be provided by unbalancing the system by changing the position of the movable tap on resistor 24. In applications in which either partial or total elimination of the carrier wave is desirable, the system disclosed is very effective in providing this result in a simple manner.

Figures 3, 4, 5, 7:
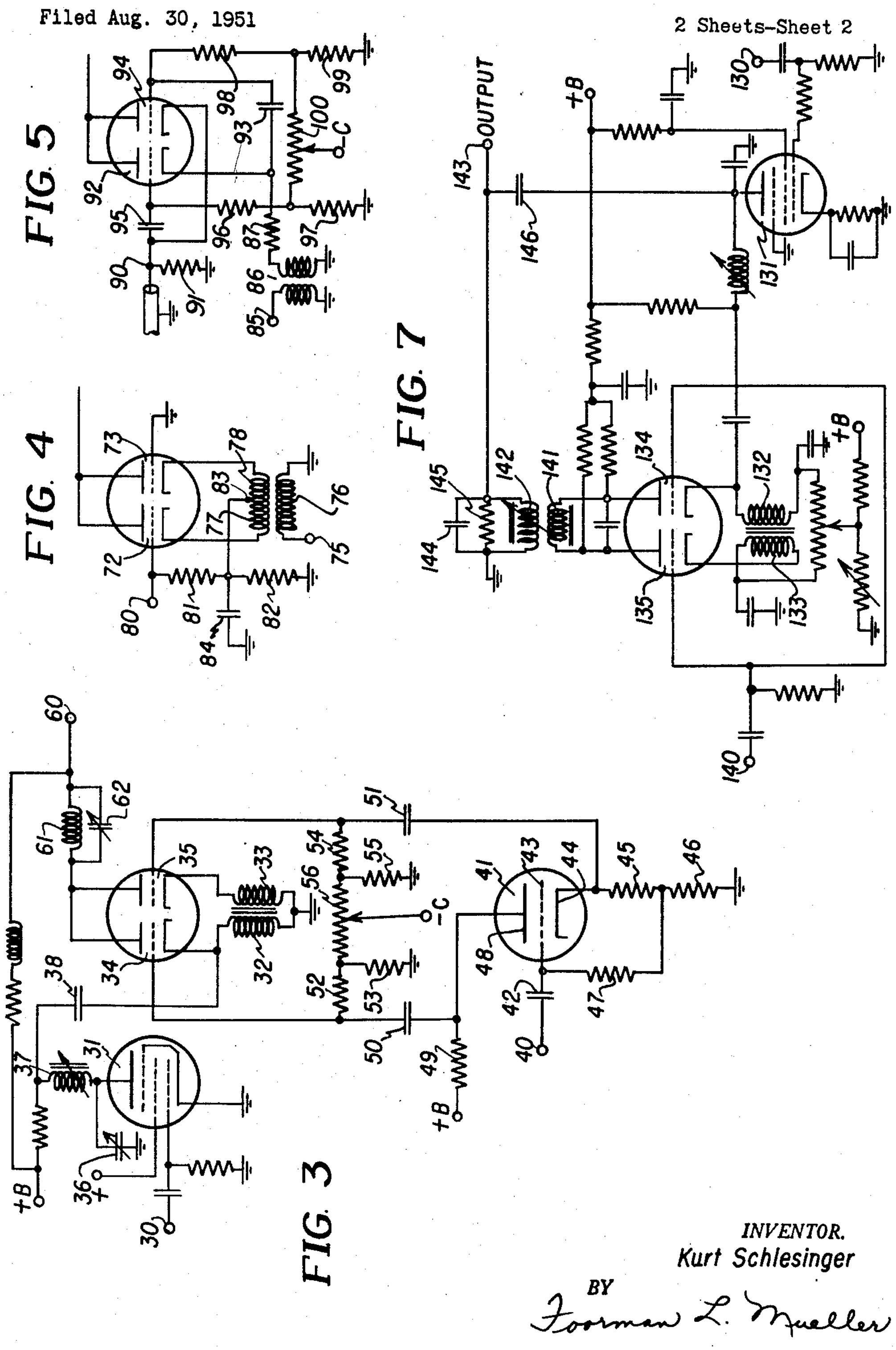
Fig. 3 illustrates the use of the double-balanced modulator in a television system.

The complete circuit diagram for a double-balanced modulator system found satisfactory for the television application just described is illustrated in Fig. 3. The system basically is identical to that illustrated in Fig. 1 but is shown in a more complete form. The carrier wave is applied at terminal 30 and amplified in the stage including the pentode tube 31. The carrier wave is applied from this stage to the bifilar windings 32 and 33 which are oppositely phased so that the signal applied to the cathodes of triodes 34 and 35 are equal and opposite. In order to provide the currents required in the bifilar windings, the amplifier includes a resonant output circuit including condenser 36, inductor 37, condenser 38 and the winding 32. When operating at the frequencies illustrated in Fig. 2, the following values have been found to be satisfactory:

| | |
|---|---|
| Condenser 36 | 25 micromicrofarads (variable). |
| Inductor 37 | 50 microhenries (variable). |
| Condenser 38 | .01 microfarad. |
| Winding 32 | 5 microhenries. |

The video signal is applied to the modulator system at terminal 40 and is then applied to the triode section 41 which serves as a phase splitter. Amplifier stages may be provided ahead of the phase splitter as may be necessary. The video signal is applied through condenser 42 to the grid 43 of the triode 41. The cathode 44 of the tube is connected to ground through resistors 45 and 46, with the common connection therebetween being connected through resistor 47 to the grid 43. The anode 48 of the tube is connected to plus B through resistor 49. The balanced outputs from the anode 48 and cathode 44 of the tube 41 are applied through condensers 50 and 51 to the grids of the triodes 34 and 35 which form the modulating sections. To completely balance the signals applied to the grids, a balancing network is provided including resistors 52, 53, 54, 55 and 56, with the resistor 56 having a movable tap connected to a negative potential minus B.

The output of the triode sections 34 and 35 are directly combined and applied to an output terminal 60. A trap formed by inductor 61 and condenser 62 may be provided in the output circuit to eliminate the second harmonic or double carrier frequency of 8 megacycles. As previously described, this output will provide the modulation products without the modulating signal and the carrier.

The balanced modulator system in accordance with the invention may be practiced in various manners and in Figs. 4 and 5 alternate arrangements for applying carrier and modulation to the triodes of the sections are illustrated. In each of these systems, the requirement of a tube for providing balanced modulating signals to the two sections is eliminated, so that the entire system may be provided by two triodes included in a single envelope.

In Fig. 4 the carrier is applied to the terminal 75 and inductively fed from the primary winding 76 to the balanced secondary windings 77 and 78 connected to the cathodes of the triodes 72 and 73. The modulating signal is applied to the terminal 80, with the terminal being connected directly to the grid of the triode 72 and connected through the voltage divider including resistors 81 and 82 to the tap 83 between the windings 77 and 78. A small condenser 84 is provided for grounding the center of the balanced windings with respect to the carrier. Resistors 81 and 82 have such values that the modulating signal applied to the tap 83 has an amplitude one-half that of the modulating signal applied to the grid of the triode 72. This half-amplitude modulating signal is therefore applied to the cathode of both triodes. The grid of the triode section 73 is connected to ground. This results in potentials between the grid and cathode of the two sections which are of equal amplitude and opposite phase. The plates of the two triodes may then be directly connected together and the combined output thereof will include the sidebands but no carrier and no input signal, since these will both be balanced out.

Another form which the modulator system may take is illustrated in Fig. 5. In this system the carrier wave is applied at terminal 85 and the modulating signal at terminal 90. The carrier wave is applied through transformer 86 and resistor 87 to the cathode of the triode section 92 and through condenser 93 to the grid of triode section 94. The modulating signal is applied across resistor 91 which may provide the required terminating impedance for a coaxial line. The modulating signal is then applied to the cathode of the triode section 94 and through condenser 95 to the grid of the triode section 92. Since both the carrier wave and the modulating signal are applied to the grid of one triode and to the cathode of the other, each of these will appear in the triode sections in opposite phase. In order to provide complete balance of the signals, a biasing network is provided including resistors 96, 97, 98 and 99 and 100, with the resistor 100 having a movable tap connected to a negative potential which may be adjustably applied to the triodes to provide complete balance.

As described in connection with Fig. 2, the output of the modulator system utilizing triode modulating sections will include the double frequency components of the carrier wave and the modulating signal as well as the modulation products. The level of the double frequency components can be kept low if the level of the signals applied to the system are held within the range of linear G*m* variations. As the amplitude of the double frequency components will be reduced, they may not be objectionable. This is particularly true in cases in which the harmonic spectrum of the video signal includes many terms. The double frequency component of the carrier wave can be easily removed by a trap circuit as illustrated in Fig. 5, but the double frequency components of the modulating signal may be within the range of the desired modulation products, and in such case cannot be as easily removed. In Figs. 8 and 9 systems are disclosed in which the double frequency components are eliminated.

Figure 6:
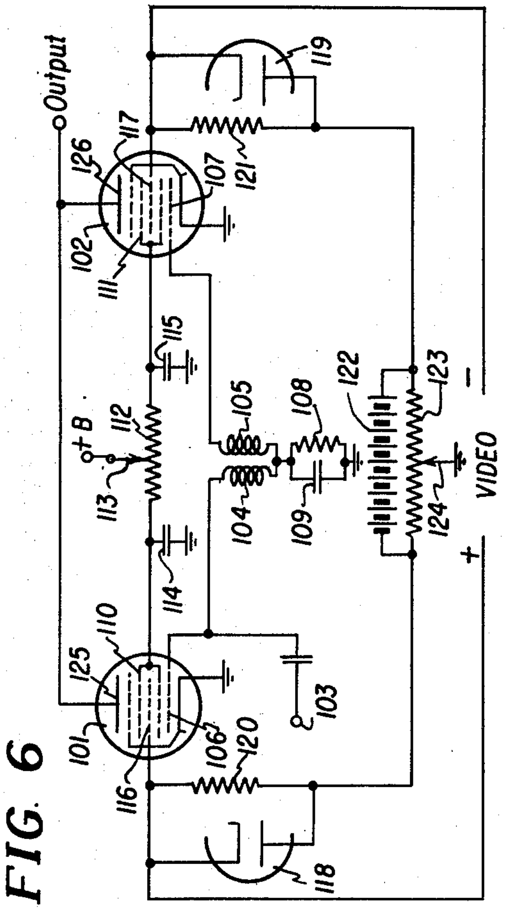
Figs. 4, 5, 6 and 7 illustrate other embodiments of the double-balanced modulator in accordance with the invention.

Fig. 6 illustrates the modulator system in accordance with the invention utilizing pentagrid tubes which provide product modulation without second harmonics. The tubes 101 and 102 provide the two modulating sections. The carrier wave is applied to the system at terminal 103 and is balanced in the bifilar windings 104 and 105 in the manner previously described in connection with Fig. 3. The carrier wave is applied from the windings 104 and 105 to the No. 1 grids 106 and 107 respectively of the tubes 101 and 102. A bias is provided for the grids through the resistor 108 bypassed by condenser 109. The carrier waves in the two tubes may be accurately balanced by the potentials applied to the screen grids 110 and 111 of the tubes. These screen grids are connected to end terminals of resistor 112 which has a movable tap 113 connected to plus B for adjusting the potential applied to the screen grids. Condensers 114 and 115 provide bypass for the screen grids.

The video signal is applied in balanced form to the No. 2 modulating grids of the pentagrid tubes designated 116 and 117, respectively. To provide the direct current components for the video signal and balance for the two sections, diode rectifiers 118 and 119, bridged by load resistors 120 and 121, are connected to the positive and negative ends of a voltage source 122. The voltage source 122 is bridged by a resistor 123 having a movable tap 124 connected to ground. This provides an adjustment of the bias applied to the video modulating component to provide complete balance thereof.

The plates of the two pentagrid tubes can be directly connected so that the outputs thereof directly add. When the video is held at such a level that the tubes are not overdriven, only the fundamental components and the modulation products will apear in the output. The fundamental components are balanced out, so that the output of the system in Fig. 6 will include only the modulation products without either the fundamental or double frequency components of the carrier wave or the modulating signal. Since the two sections are additive, the modulation prodcts will be added and will therefore be of increased amplitude.

In Fig. 7 there is illustrated a further balanced modulator system in which the fundamental components as well as the second harmonic components of the modulating signal and carrier are balanced out. In this system the carrier wave is applied at terminal 130 and is amplified in the stage including the pentode tube 131. The signal is applied from this stage to bifilar windings 132 and 133 as described in connection with Fig. 3. The bifilar windings are connected to the cathodes of the triode tubes 134 and 135 of the two modulating sections. The modulating signal is received at terminal 140 and applied to the grids of the triodes of the modulating sections in phase. The output of the two modulating sections are connected to the winding 141 which connects the two sections differentially, or in opposition. The winding 141 is inductively coupled with winding 142 from which the output of the system is derived at output terminal 143. Condenser 144 and resistor 145 are provided for tuning and damping the output circuit. The winding 141 balances out the objectionable fundamental component of the modulating signal and also the second harmonics. However, the carrier in the two sections add together and therefore appear in the winding 141. The carrier may be eliminated by neutralization, and to accomplish this, the carrier is applied from the pentode tube 131 through condenser 146 to the winding 142 wherein it is mixed in opposite phase with the carrier from the modulator sections so that the carrier components are completely eliminated.

It is therefore seen that the double-balanced modulator system may be provided in several forms which render it suitable for various different applications. As previously stated, it is particularly applicable in systems wherein the modulating signal has a frequency close to the frequency of the carrier wave so that filtering of the modulating signal from the modulation products is difficult. In circuits actually constructed, the elimination of the modulating signal by the double-balanced modulator was more effective than the best filtering networks known. This has also been substantiated by a mathematical analysis. The modulator system can be provided by very simple circuits as have been illustrated. In addition to the application of the system to color television as has been mentioned, the system may also be used in many other applications. For example, it has also been utilized in dot arresting and dot interlace monochrome television systems. Circuits as illustrated in Figs. 3, 4 and 5 have been found satisfactory in the color television application mentioned, with the double frequency components not being harmful. These circuits provide arrangements so that the balance of the modulating system may be easily adjusted to provide optimum results.

Although certain embodiments of the invention have been disclosed which are illustrative thereof, it is obvious that various changes and modifications can be made in the system within the intended scope of the invention as defined in the appended claims.

I claim:

1. A modulator system for modulating a carrier wave having a frequency of the order of 3.5 megacycles or more by a modulating signal which varies in frequency up to a frequency of the order of 1.5 megacycles, said system including in combination, first and second modulating sections each including a triode valve having a cathode, an anode and a control grid, means for applying said carrier wave to said sections including a pair of bifilar windings connected between said cathodes of said valves and a reference potential for applying said carrier wave thereto with equal amplitude and in opposite phase, means for applying said modulating signal between said control grids and said cathodes of said sections with substantially equal amplitude and opposite phase, resistor means connecting said control grids of said sections to said reference potential for providing a bias therefor and for balancing the signals applied to said valves so that the components thereof in said anodes of said valves are equal and opposite, and means connecting said anodes of said valves for combining the modulation products of said two sections in additive relation, said last named means including a trap for eliminating the second harmonic of the carrier wave.

2. A modulator system for modulating a carrier wave in the frequency range from 3.5 to 4.0 megacycles by a modulating signal which varies in frequency and which extends to frequencies of the order of 1.5 megacycles, said system including in combination, first and second modulating sections each including a triode valve having a cathode, an anode, and a control grid, means for applying said carrier wave to said sections including a pair of bifilar windings individually connected to said cathodes of said valves for applying said carrier wave to said valves with equal amplitude and in opposite phase, means for applying said modulating signal to said control grid of each of said valves with substantially equal amplitude, resistor means connecting said control grids of said valves to a reference potential for providing biases therefor, balancing means for balancing the effect of said modulating signal on said control grids, and means connected to said output electrodes of said valves for combining the modulation products of said two sections in additive relation, and for balancing out the modulation signals therein.

3. A modulator system for modulating a carrier wave by a modulating signal which varies in frequency up to frequencies of the order of one half the frequency of the carrier wave, said system including in combination, first and second modulating sections each including an electrode discharge valve having a grid, at least one other input electrode, and an output electrode, means for applying said carrier wave to said sections including a pair of bifilar windings connected between said other input electrode of each of said valves and a reference potential for applying said carrier wave thereto with the same amplitude and in opposite phase, means for applying said modulating signal to said grid of each of said valves with substantially the same amplitude and opposite phase with respect to said reference potential, resistor means connecting said grids of said sections to said reference potential for providing self-bias therefor and for balancing the effect of the signals applied to said valves so that the components thereof in said output electrodes of said valves are equal and opposite, and means connected to said output electrodes of said valves for combining the outputs of said two modulating sections in additive relation so that the side bands of the modulation of said two sections are added and the carrier wave and modulating signals thereof are canceled, said last named means including a filter for eliminating the second harmonic of the carrier wave.

4. A modulator system for modulating a carrier wave by a modulating signal which varies in frequency up to frequencies of 1.5 megacycles, said system including in combination, first and second modulating sections each including a triode electrode discharge valve having a grid, a cathode and a plate, means for applying said carrier wave to said sections including a pair of bifilar windings connected between said cathode of each of said valves and a reference potential for applying said carrier wave thereto with substantially the same amplitude and in opposite phase, a coupling network connected to said grids of said valves for applying said modulating signal thereto, said coupling network including an electron valve phase splitter circuit for applying said modulating signal to said grids at substantially equal amplitudes and opposite phases with respect to said reference potential, said coupling network including resistor means connecting said grids of said sections to said reference potential for providing a bias therefor, said coupling network also including adjustable means for balancing the effect of the signals applied to said grids so that the components thereof in said plates of said valves are equal and opposite, and means connected to said plates of said valves for combining the outputs of said two modulating sections in additive relation so that the side bands of the modulation of said two sections are added and the carrier wave and modulating signals thereof are cancelled.

5. A modulator system for modulating a carrier wave by a modulating signal which varies in frequency up to frequencies of the order of 1.5 megacycles, said system including in combination, first and second modulating sections each including a triode electrode discharge valve having a grid, a cathode and a plate, means for applying said carrier wave to said sections including a pair of bifilar windings connected between said cathode of each of said valves and a reference potential for applying said carrier wave thereto with substantialy the same amplitude and in opposite phase, a coupling network connected to said grids of said valves for applying said modulating signal thereto at substantially equal amplitudes and opposite phases with respect to said reference potential, said coupling network including resistor means connecting said grids of said sections to said reference potential for providing a bias therefor, said coupling network also including adjustable resistance means for balancing the effect of the signals applied to said grids so that the components thereof in said plates of said valves are equal and opposite, and output circuit means connected to said plates of said valves for combining the outputs of said two modulating sections in additive relation so that the side bands of the modulation of said two sections are added and the carrier wave and modulating signals thereof are cancelled, said output circuit means including filter means for removing frequencies above the desired side bands.

References Cited in the file of this patent

UNITED STATES PATENTS

| | | |
|---|---|---|
| 1,861,183 | Hough | May 31, 1932 |
| 2,358,520 | Landon | Sept. 19, 1944 |
| 2,399,586 | Toomin | Apr. 30, 1946 |
| 2,429,755 | Hallmark | Oct. 28, 1947 |
| 2,441,127 | Atkins | May 11, 1948 |
| 2,443,754 | Vale | June 22, 1948 |
| 2,491,107 | Haas | Dec. 13, 1949 |
| 2,504,469 | Tillman | Apr. 18, 1950 |
| 2,591,821 | Jacobsen | Apr. 8, 1952 |